Oct. 21, 1941.    F. E. FREY ET AL    2,259,630
PROCESS FOR THERMALLY REACTING HYDROCARBONS
Filed Jan. 31, 1936
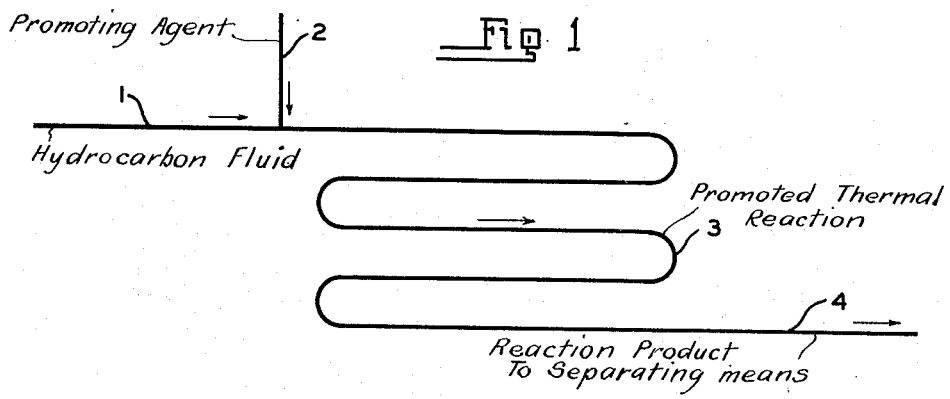
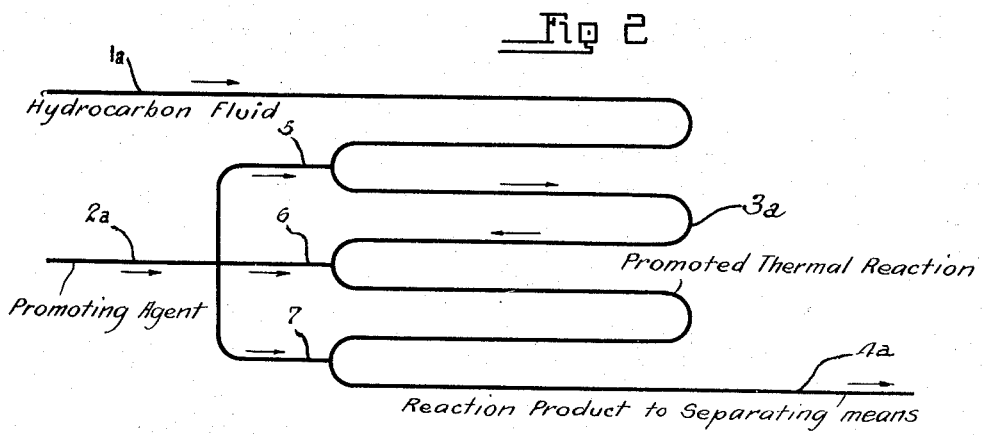
FREDERICK E. FREY
HAROLD J. HEPP    INVENTOR.
GLEN H. MOREY
BY
ATTORNEYS.

Patented Oct. 21, 1941

2,259,630

UNITED STATES PATENT OFFICE 2,259,630

PROCESS FOR THERMALLY REACTING HYDROCARBONS

Frederick E. Frey, Harold J. Hepp, and Glen H. Morey, Bartlesville, Okla., assignors to Phillips Petroleum Company, Bartlesville, Okla., a corporation of Delaware Application January 31, 1936, Serial No. 61,814

16 Claims. (Cl. 260—666)

This invention relates to processes for thermally reacting hydrocarbons and more specifically to means for more efficiently carrying out such reactions with the aid of reaction promoting agents whereby lower temperatures and with shorter reaction periods may be employed than those required for the ordinary uncatalyzed reaction.

Thermal reaction or cracking is commonly applied to hydrocarbon oils to produce hydrocarbons of lower molecular weight such as gasoline and gas, and to normally gaseous hydrocarbons to produce normally gaseous olefines and paraffins through scission reactions and also hydrocarbons of higher molecular weight through polymerization. The proportion of such higher hydrocarbons may be small when cracking is conducted at low pressures but may be formed in large amount when high pressures are employed. Volatile normally liquid hydrocarbons produced in this way are used as motor fuel, and normally gaseous olefin hydrocarbons obtained by cracking in turn may be converted into motor fuel by polymerization or put to a variety of other uses.

Pyrolytic reactions of saturated and unsaturated hydrocarbons may be induced under conditions of temperature and time too mild to bring about ordinary homogeneous reaction by means of catalytic materials which are not destroyed in the process. The course of the reaction is dependent on the catalytic material used. Thus dehydrogenation catalysts will effect dehydrogenation of saturated hydrocarbons. Other catalytic materials effect scission reactions together with more or less dehydrogenation, while still other catalysts are applicable to the conversion of unsaturated hydrocarbons to yield products of higher molecular weight.

Our invention provides a new and different method of bringing about thermal decomposition reactions under milder conditions than those required for the ordinary uncatalyzed reactions, which is based upon the discovery that such thermal decomposition reactions can be induced by other reactions occurring concomitantly. We have discovered that certain organic compounds, themselves decomposed readily by heat will in the presence of saturated and unsaturated hydrocarbons induce thermal reaction in the latter under conditions of heating too mild to effect reaction ordinarily, the organic compound present being decomposed in the process. We have found that such a compound, which may be designated a reaction promoting agent, will induce the decomposition of ten and more molecular equivalents of hydrocarbon under appropriate conditions which are a part of this invention.

This invention has for its objects the use of such compounds to effect thermal reaction of saturated and also unsaturated hydrocarbons under mild and economical conditions; the cracking of petroleum oil under mild conditions to produce gasoline; the conversion of gaseous hydrocarbons, particularly those of higher molecular weight than methane, into lighter unsaturated hydrocarbons and also into oils with higher yields and higher ultimate conversions than are obtainable in the absence of such reaction promoting agents. Especially in thermal conversion at high pressure of ethane and propane is a reduction in reaction time and temperature of value because of the severe conditions to which metals used for the construction of reaction vessels are exposed. Another object is the control of the thermal conversion operation by the controlled introduction of a reaction promoting agent. Other objects will be apparent as the description proceeds.

We have found that class of the metal alkyls which will volatilize without decomposition to show reaction promoting action in high degree. Zinc, cadmium, mercury, and lead alkyls are particularly suitable, all of which decompose quite rapidly below 400° C. The nature of the alkyl groups may vary widely. The methyl and ethyl metal alkyls are usually preferable since they are somewhat more stable to heat than the higher homologs and are yet sufficiently readily decomposed to exert strong reaction promoting action upon hydrocarbons. Alkylene oxides such as ethylene oxide likewise show high promoting activity. A more mild promoting action is exhibited by hydrocarbons which may nevertheless be advantageously utilized since the latter are comparatively inexpensive. The decomposition temperature of the hydrocarbon added as promoter should be lower than that of the hydrocarbons the decomposition of which is to be promoted. In general these promoting agents are organic compounds having a decomposition temperature lower than that of the hydrocarbons in which thermal reaction is to be induced. The mechanism of the promoting action is obscure, but appears to be attributable to breaking of the metal to carbon bond of a metal alkyl of an oxygen to carbon bond of an alkylene oxide or in the case of hydrocarbons, of a carbon to carbon bond to yield active molecules containing unsatisfied valences which induce a chain reaction wherein activation is transferred from molecule to molecule of hydrocarbon accompanied by a series of resultant molecular reactions. Several reactions which proceed by a chain mechanism are known, which take place with evolution of heat and the initiating of such reactions by various means has been described. The thermal reactions of the paraffins usually absorb heat, the simple thermal decomposition absorbs heat strongly. However, the chain mechanism will account for the induced decomposition of many equivalents of paraffin by the promoting agents described, if it be assumed that chain reactions are possible of andothermic type wherein heat is not developed by reaction which may sustain reaction through the formation of thermally hot molecules but which must do so through structural activation.

The paraffins other than methane and cyclo-paraffins are susceptible to promoted decomposition and reaction with the agents described, as are also the unsaturated hydrocarbons to yield products of both lower and higher molecular weight. The promoting agents may comprise many different molecular species, and promoting action is not limited to the classes of compounds described. The presence of the alkylene oxygen grouping in the molecule and carbon to metal linkages is responsible for the strong promoting action observed with metal alkyl and alkylene oxides. In the case of hydrocarbons as promoting agents, the hydrocarbon introduced as promoting agent should be more readily pyrolyzed than the hydrocarbons whose reaction is to be promoted. The comparative thermal stabilities of many hydrocarbons are known and in general stability decreases as the homologous series is ascended.

Ethane and propane are among the more thermally stable hydrocarbons and predominantly saturated hydrocarbons of higher molecular weight are very suitable as promoting agents to induce thermal reactions. The adjacent homologs of higher molecular weight, propane and butane respectively, exert a substantial degree of promoting action, and higher paraffins are somewhat more efficient, such as hydrocarbon distillate boiling in the gasoline range or somewhat above. A substantial quantity of promoting agent greater than 2 per cent of the hydrocarbon to be thermally reacted will usually be required, and when the concomitant decomposition of the promoting hydrocarbon yields desirable products, large proportions may be used advantageously. The thermal reaction promoted as described may be one which is conducted at low pressure to produce hydrocarbons of lower molecular weight, or it may be one conducted at high pressure either to thermally convert normally gaseous or higher hydrocarbons. Olefins may be present and take part in the reaction. Under high pressures products of higher molecular weight than the hydrocarbons treated result, and thermal reaction under elevated pressure of a mixture of normally gaseous paraffins and olefins to produce normally liquid hydrocarbons takes place more readily in the presence of reaction promoting agents.

The conditions of time and temperature required for effecting thermal reaction with the aid of promoting agents will be somewhat milder than the conditions required in the absence of promoting agents and can be readily determined by experiment.

Fig. 1 illustrates diagrammatically one embodiment of the present invention; and, Fig. 2 illustrates diagrammatically a modified embodiment of the invention.

One embodiment of the process may be practiced as is shown in Fig. 1. Hydrocarbon fluid such as a petroleum distillate enters through conduit 1 and mingles with the promoting agent entering through conduit 2. The mixture passes through a heating element 3 wherein it is heated to a temperature and for a time sufficient to effect thermal reaction and largely destroy the reaction promoting agent, whereby the petroleum distillate is thermally reacted and then discharged through conduit 4.

When the decomposition temperature of the promoting agent is particularly low or the temperature of uncatalyzed decomposition of the hydrocarbon fluid is particularly high, a decreased consumption of promoting agent results from the heating of the hydrocarbon to reaction temperature level and adding promoting agent during the period of the reaction and subsequent to the initial stages of reaction, as shown in the modified embodiment of the invention as illustrated in Figure 2 to be described. Hydrocarbon fluid enters through conduit 1—A, and is heated in coil 3—A to the temperature at which the promoted reaction takes place. The promoting agent entering through conduit 2—A is divided into a plurality of streams in conduits 5, 6 and 7 through which it passes to coil 3—A and is dispersed in the hydrocarbon stream. The thermally reacted hydrocarbon is discharged through conduit 4—A. The inlets 5, 6 and 7 are suitably so spaced and so great in number that destruction of the promoting agent is not wholly completed in the hydrocarbon stream between successive additions of the promoting agent. The thermally reacted hydrocarbons are then discharged from heating coil 3—A through conduit 4—A.

*Example 1.*—A stream of n-butane under a pressure slightly below atmospheric was passed through a heated glass tube wherein it was maintained at 500° C. for 7 seconds. Into the butane was introduced 2 mol. per cent of mercury dimethyl vapor as it entered the heated tube. The gas issuing from the tube was found to have the following composition (volume per cent).

| | |
|---|---:|
| Hydrogen | 0.6 |
| Methane | 11.8 |
| Ethylene | 4.6 |
| Ethane | 3.3 |
| Propylene | 6.0 |
| Propane | 0.7 |
| Butylenes | 1.2 |
| Butane | 70.7 |
| Higher | 1.1 |
| Total | 100.0 |

The mercury dimethyl was found to have virtually completely decomposed. About 6 molecules of butane were decomposed per molecule of mercury dimethyl introduced.

In an identical experiment, except that mercury dimethyl was not introduced, decomposition of less than 1 per cent of the butane took place. By increasing the temperature to 575° C. and the reaction time to 25 seconds an equivalent extent of decomposition was brought about in the absence of the alkyl. The composition of the products was virtually the same except for a slightly lower methane content, the discrepancy being about equivalent to the methane which the mercury dimethyl destroyed may have contributed.

*Example 2.*—In an experiment similar to that of Example 1, n-butane was heated to 555° C. with portionwise addition of mercury dimethyl to the reaction zone at intervals representing 0.35 second of reaction time, during which time period about 70 per cent of the mercury dimethyl present was destroyed between consecutive additions. An increased efficiency in the reaction promoting effect was obtained, 18.3 molecules of butane being decomposed per molecule of mercury dimethyl consumed, while introduction of all the mercury dimethyl at one point yielded at 557° C. only 6.5 molecules butane decomposed per molecule of the alkyl.

Example 3.—In an experiment of the type of Example 1, n-butane was heated to 561° C. for a time of 1.7 seconds, too brief to effect ordinary decomposition of the butane. One and seven-tenths mol per cent of ethylene oxide, introduced with the butane at the reaction tube inlet brought about 9.0 mol per cent decomposition of the butane.

Example 4.—n-Butane was passed at atmospheric pressure through a heated glass tube in admixture with varying amounts of n-decane, and the extent of decomposition determined. Undecomposed decane was determined as well as olefin content of the thermally treated material. After deducting the olefins contributed by the decane decomposed, the remainder, which resulted from butane decomposition, served as an index of extent of butane decomposition, butane decomposition producing 91 volumes of olefin per 100 volume of butane decomposed.

The following tabulation shows the acceleration in the decomposition of butane induced by the decomposition of the decane present.

| Temperature, °C. | Mol per cent decane in samples cracked | Percent of decane cracked | Butane (cc.'s gas) | Total olefins formed (cc.'s gas) | Olefins formed from decane (cc.'s gas) | Olefins formed from butane (cc.'s gas) | Percent of butane cracked | Fraction of butane cracked per sec. (k) | (k) (corr. 575° C.) |
|---|---|---|---|---|---|---|---|---|---|
| 573 | 3.6 | 30 | 163 | 19.9 | 4.0 | 15.9 | 10.8 | 0.0094 | 0.0100 |
| 571 | 2.4 | 30 | 194 | 19.9 | 3.2 | 16.7 | 9.6 | 0.0082 | 0.0095 |
| 575 | 0.0 |  | 275 | 18.8 |  | 18.8 | 7.6 | 0.0062 | 0.0062 |

In similar experiments with the more difficultly decomposed ethane and propane a similar accelerating effect was observed on the addition of butane, pentanes, and neopentane.

From the foregoing it is believed that the process may be readily understood by those skilled in the art and it is manifest that changes may be made in the details as set forth without departing from the spirit of the invention as expressed in the following claims.

Having described our invention, what we claim is:

1. In a process for thermally converting paraffin hydrocarbons of higher molecular weight than methane the improvement which comprises increasing the velocity of conversion, at any temperature at which unpromoted thermal conversion proceeds with less than a desired velocity, by admixing not more than 10 mol per cent of a metal alkyl, capable of being volatilized without decomposition, with the hydrocarbon to be converted.

2. In a process for the thermal conversion of a substantially methane-free normally gaseous paraffinic hydrocarbon mixture, the improvement which comprises maintaining for said process maximum conversion conditions at which said hydrocarbon mixture is normally substantially unconverted, and adding to said hydrocarbon mixture between two and ten mol per cent of a metal alkyl capable of being volatilized without decomposition to promote conversion producing an optimum yield of conversion products.

3. In a process for converting normally gaseous paraffin hydrocarbons to form higher boiling hydrocarbons the improvement which comprises subjecting a substantially methane-free normally gaseous paraffinic hydrocarbon mixture to conversion conditions of temperature and time such that unpromoted thermal conversion to form higher boiling hydrocarbons is undesirably limited and adding to said hydrocarbon mixture between two and ten mol per cent of a metal alkyl which can be volatilized without decomposition to promote conversion of said paraffinic hydrocarbon mixture to form higher boiling hydrocarbons, said metal alkyl being substantially completely decomposed under said conversion conditions of temperature and pressure.

4. A process according to claim 1 in which the metal alkyl is a lead alkyl.

5. A process according to claim 1 in which the metal alkyl is a mercury alkyl.

6. A process according to claim 1 in which the metal alkyl is a zinc alkyl.

7. A process according to claim 2 in which the metal alkyl is a lead alkyl.

8. A process according to claim 2 in which the metal alkyl is a mercury alkyl.

9. A process according to claim 2 in which the metal alkyl is a zinc alkyl.

10. A process according to claim 3 in which the alkyl is a lead alkyl.

11. A process according to claim 3 in which the metal alkyl is a mercury alkyl.

12. A process according to claim 3 in which the metal alkyl is a zinc alkyl.

13. In a process for thermally converting paraffin hydrocarbons of higher molecular weight than methane, the improvement which comprises maintaining such a mixture at a reaction temperature at which unpromoted thermal conversion proceeds with less than the desired velocity for a period of time sufficient to effect a promoted thermal conversion and admixing with said hydrocarbon mixture a volatilizable metal alkyl in quantity sufficient to promote thermal conversion but not more than 10 mol per cent, a plurality of times during the said period.

14. The process of claim 13 in which the metal alkyl is a lead alkyl.

15. The process of claim 13 in which the metal alkyl is a zinc alkyl.

16. The process of claim 13 in which the metal alkyl is a mercury alkyl.

FREDERICK E. FREY.
HAROLD J. HEPP.
GLEN H. MOREY.

CERTIFICATE OF CORRECTION.

Patent No. 2,259,630. October 21, 1941.

FREDERICK E. FREY, ET AL.

It is hereby certified that error appears in the printed specification of the above numbered patent requiring correction as follows: Page 3, second column, line 36, claim 10, for "the alkyl" read --the metal alkyl--; page 3, in the heading to the table, last column thereof, after "corr." insert --to--; and that the said Letters Patent should be read with this correction therein that the same may conform to the record of the case in the Patent Office.

Signed and sealed this 6th day of January, A. D. 1942.

(Seal)

Henry Van Arsdale,
Acting Commissioner of Patents.